Figure 1:
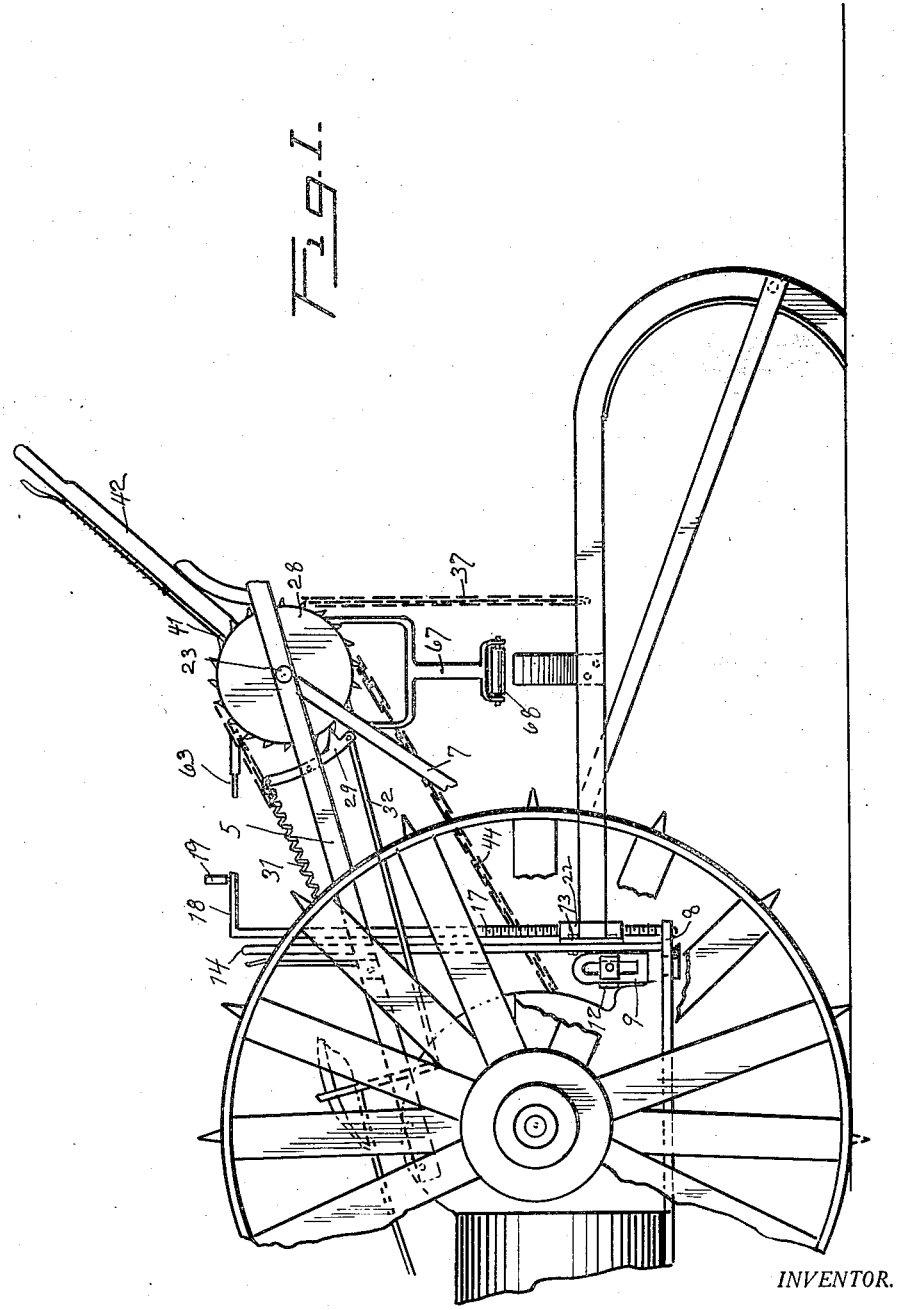

Feb. 2, 1926.

C. C. BUSSINGER 1,571,789

HOISTING DEVICE

Filed March 9, 1925

4 Sheets-Sheet 1

INVENTOR.

C. C. BUSSINGER

BY Victor J. Evans

ATTORNEY.

Feb. 2, 1926.
C. C. BUSSINGER
HOISTING DEVICE
Filed March 9, 1925
1,571,789
4 Sheets-Sheet 2
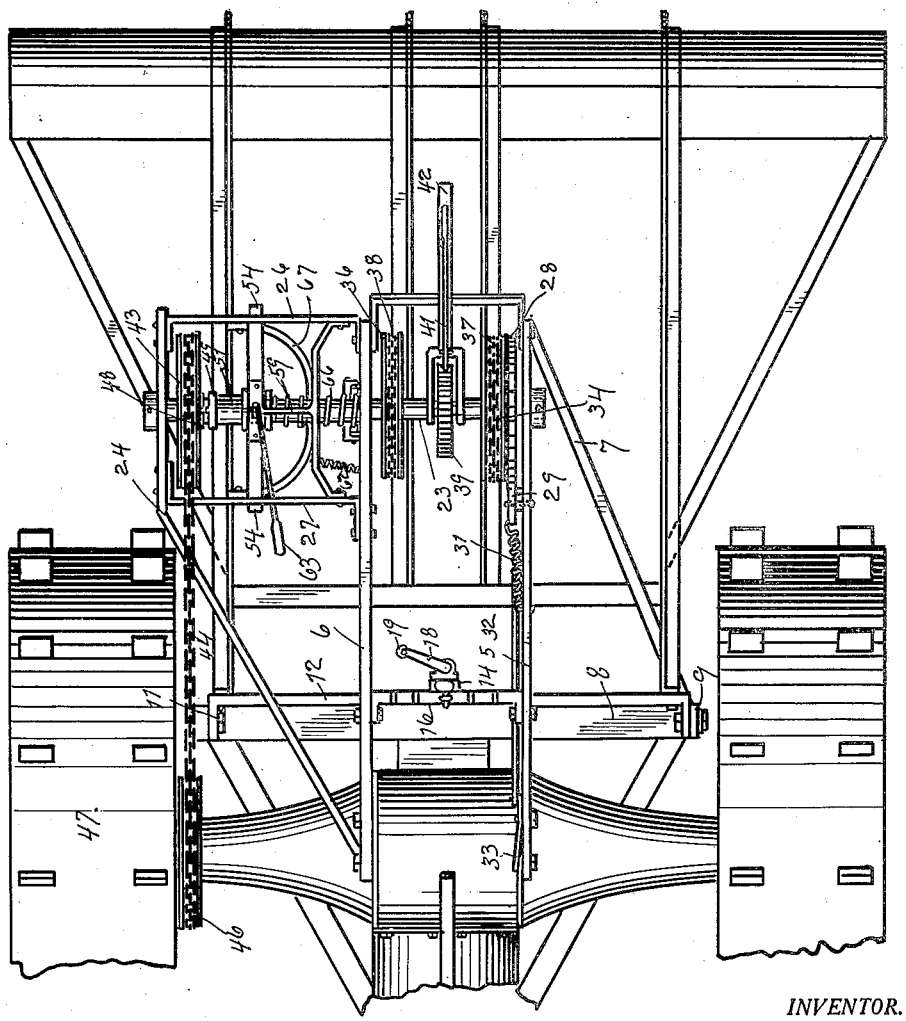
Fig. II.
INVENTOR.
C. C. BUSSINGER
BY *Victor J. Evans*
ATTORNEY.

Feb. 2, 1926.
C. C. BUSSINGER
1,571,789
HOISTING DEVICE
Filed March 9, 1925      4 Sheets—Sheet 3
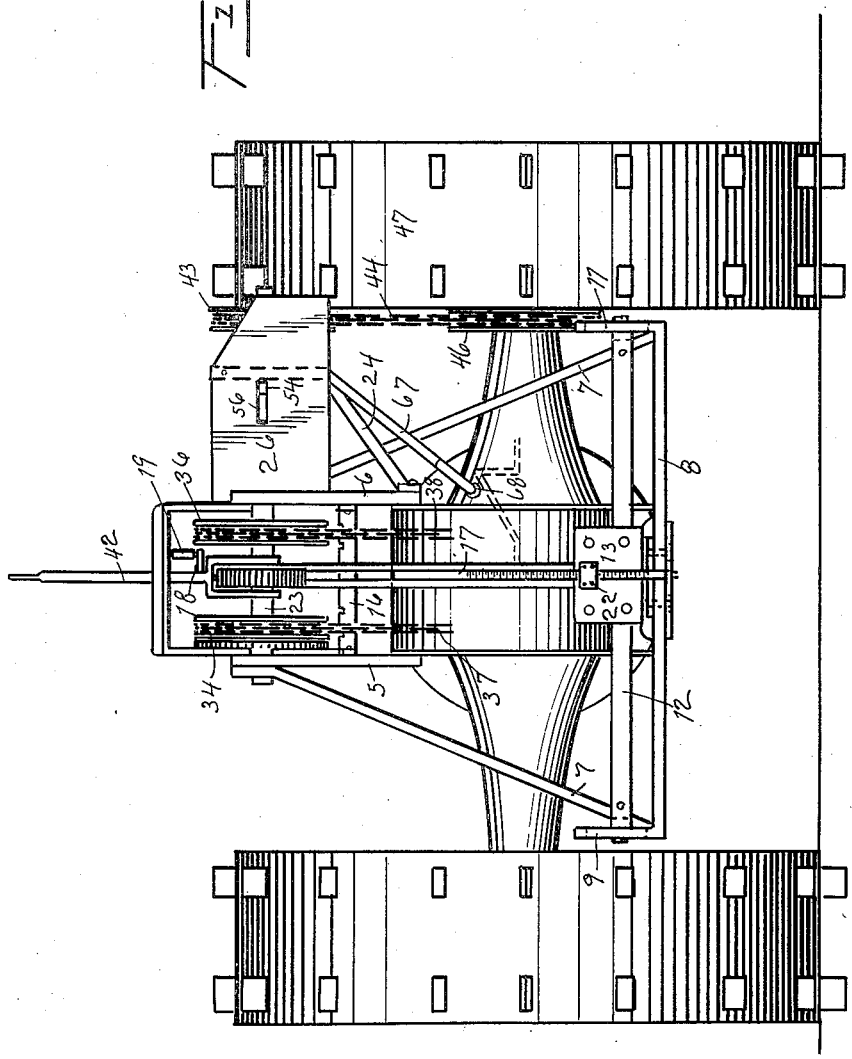
INVENTOR.
C. C. BUSSINGER
BY
  *Victor J. Evans*
        ATTORNEY.

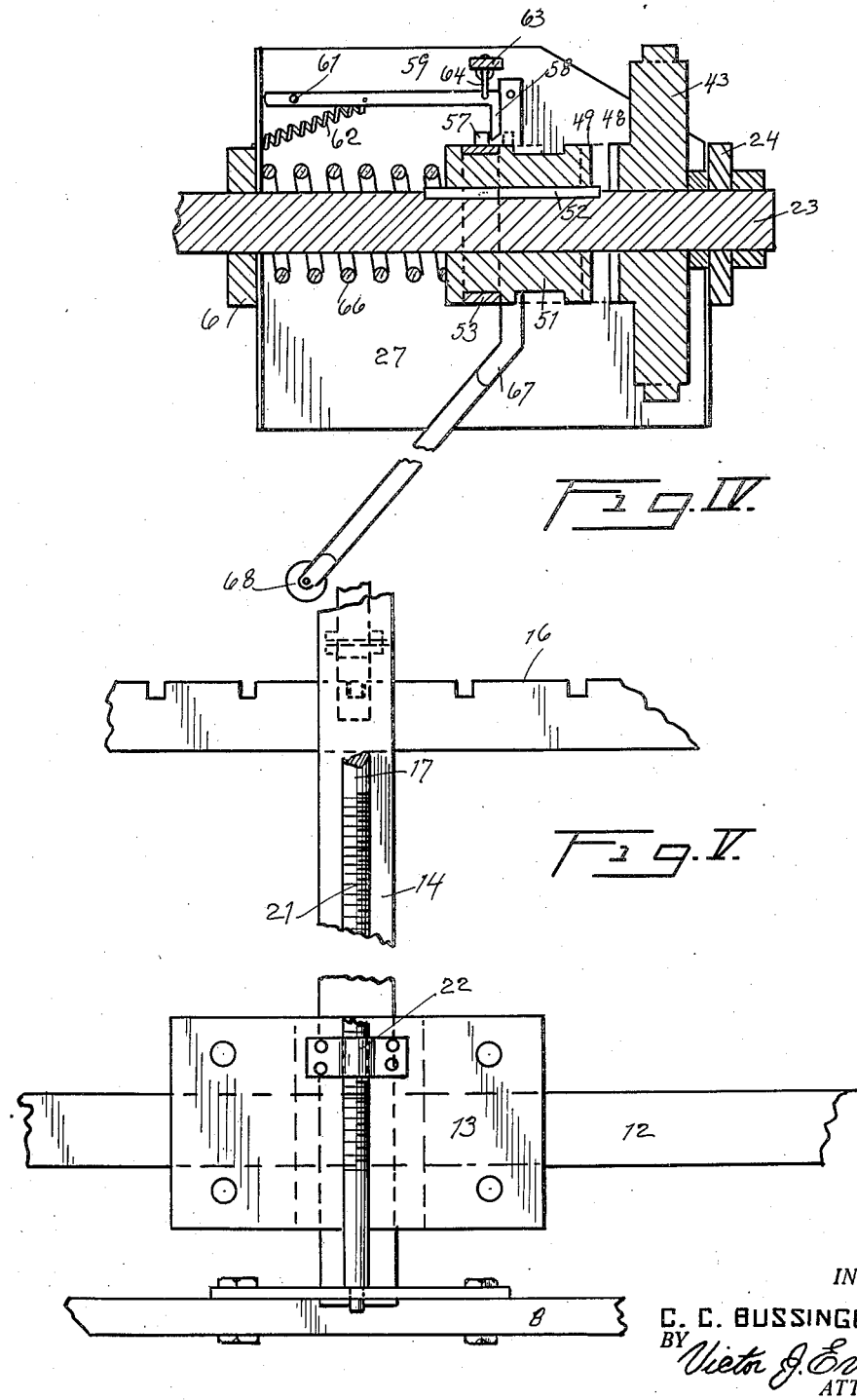

Patented Feb. 2, 1926.

1,571,789

UNITED STATES PATENT OFFICE.

CHARLES C. BUSSINGER, OF MODESTO, CALIFORNIA.

HOISTING DEVICE.

Application filed March 9, 1925. Serial No. 14,217.

*To all whom it may concern:*

Be it known that I, CHARLES C. BUSSINGER, a citizen of the United States, residing at Modesto, in the county of Stanislaus and State of California, have invented new and useful Improvements in Hoisting Devices, of which the following is a specification.

This invention relates to improvements in hoisting devices and has particular reference to a hoisting device adapted to be attached to the rear of a tractor or like vehicle so as to lift cultivator implements such as plows, scrapers and the like.

The principal object of this invention is to provide a simple device whereby the power of the tractor will accomplish the raising operation and at the same time, provide manual means whereby the raising may be manually accomplished if desired.

Another object is to provide means for automatically stopping the raising operation when the cultivator has reached a predetermined height.

Other objects and advantages will be apparent during the course of the following description.

In the accompanying drawings forming a part of this specification, and in which like numerals are employed to designate like parts throughout the same, Figure I is a side elevation of my device attached to the rear of a tractor, Figure II is a top plan view of Figure I, Figure III is a rear elevation of Figure I, Figure IV is an enlarged detail cross-section of the clutch mechanism, and Figure V is an enlarged detail view showing the manner of raising and lowering the draw-bar connections.

It has been common practice to attach various types of cultivators, such as, plows, harrows, scrapers and the like to the rear of a tractor and move the same over a field. However, it is often necessary to lift the cultivator in rounding a corner or proceeding across a highway, or crossing a field after the same has been completely cultivated with the particular implement being used. I have therefore devised simple means for accomplishing this purpose and by referring to the drawings, it will be seen that the numerals 5 and 6 refer to rearwardly extending frame members secured to the sides of the tractor in any suitable manner. These frame members are in turn braced by diagonal braces 7 which have their lower extremities attached to the draw-bar 8 which is suitably secured to the tractor, and has upturned ends 9 and 11.

The purpose of these up-turned ends 9 and 11 is to slidably retain a transverse vertically adjustable bar 12. This bar is attached to a plate 13 slidably positioned upon a rocking bar 14. The upper end of which bar engages a quadrant 16 secured between the frame members 5 and 6. This rocking bar also carries a threaded shaft 17 to the upper end of which is secured a lever 18 and a handle 19, the threaded portion 21 passing through a block 22 secured to the plate 13.

A shaft 23 is journaled in the frame members 5 and 6 and extends to one side thereof and is further journaled in an auxiliary frame comprising a brace 24 and side plates 26 and 27. This shaft has positioned thereon a sprocket 28 held against movement in a clockwise direction by a dog 29, which dog is held in contact therewith by a spring 31. This dog is actuated by a rod 32 connected to a hand lever 33 adjacent the driver's seat.

Positioned adjacent the sprocket 28 and on the shaft 23 is a chain pulley 34, while a similar chain pulley 36 is also positioned upon this shaft adjacent the frame member 6. Chains 37 and 38 are secured to these chain pulleys.

Interposed between the pulleys is a ratchet 39 which is adapted to operate in a counter-clockwise direction through the manipulation of a dog 41 positioned upon the actuating lever 42.

The chains 37 and 38 are adapted to extend downwardly and be connected to any cultivator implements that may be attached to the tractor, as will be hereinafter described.

Mounted upon this shaft 23 is a freely rotatable sprocket 43, which is connected by a chain 44 to a sprocket 46 secured to the wheel 47 of the tractor. The sprocket 43 carries a female clutch member 48 which is adapted to be engaged by a male clutch member 49 carried on a sliding collar 51. This collar is slidably keyed as shown at 52 to the shaft 23 and is moved by a yoke 53 having arms 54 extending through the slots 56 in the plates 26 and 27. This yoke has an up-standing lug 57 adapted to be engaged by the nose 58 of a pivoted latch 59, pivoted as at 61. A spring 62 normally keeps the nose of the latch in engagement with the lug 52.

A hand lever 63 is connected by a link 64 to the latch 59 so that the same may be moved out of engagement with the lug 57. A spring 66 contacting the frame member 6 at one end and the collar 51 at the other end, tends to force the clutch members into contact with each other.

A yoke 67 is pivoted to the plates 26 and 27 in such a manner as to contact the arm 54 of the yoke 53. The lower end of this yoke 67 carries a roller 68 which is adapted to contact an inclined member 69 secured to the cultivator.

The operation of my device is as follows:—

Assuming that the parts are arranged as shown in Figure I and that the tractor is proceeding over the ground, the chain 44 will be in constant operation thus rotating the sprocket 43. Should the driver desire to lift the implement being used, such as shown in Figures I and II, he bears down upon the hand lever 63, with the result that the nose 58 of the latch 59 is withdrawn from its contact with the lug 57. The result being that the spring 66 functions and slides the collar having the male portion of the clutch in contact with the female portion of the clutch on the rotating sprocket 43. This immediately causes the shaft 23 to rotate and as the chain pulleys 34 and 36 are rotated, the chains secured thereto and having their opposite ends secured to the cultivator, will cause the cultivator to be raised above the ground. As soon as the cultivator is raised a sufficient distance to bring the inclined member 69 into contact with the roller 68, the yoke 67 will be forced toward the left of the drawing in Figures III and IV, with the result that the yoke 53 will be moved toward the left of the drawing and again bring the lug 57 beneath the latch 59 and thus separate the two parts of the clutch which will immediately stop the rotation of the shaft.

The dog 29 will at the same time prevent retrograde movement of the shaft.

If it is desired to raise the forward portion of the cultivator, the handle 19 is grasped and rotated which causes the plate 13 to be elevated, thus lifting off the forward portion of the cultivator. Should it be desired at any time to tip the cultivator, the rocking bar 14 will be moved over its quadrant 16 the desired amount.

When it is desired to lower the cultivator the driver merely pushes upon the handle 33 which withdraws the dog 29 from its engagement with the ratchet 28 with the result that retrograde movement is permitted of the shaft 23 and the cultivator implement is dropped until it comes in contact with a supporting surface, such as the ground.

It will thus be seen that I have provided efficient and simple means for accomplishing all the objects above set forth.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, the combination with a tractor and a cultivator, of a frame secured to said tractor, a shaft rotatably mounted in said frame and adapted to raise the cultivator when said shaft is rotated, a sprocket mounted on said shaft, a sprocket mounted on said tractor, a chain extending between said sprockets, a clutch adapted to engage said sprocket, spring means adapted to normally cause said clutch to engage said sprocket, a latch for retaining said clutch out of engagement with said sprocket, means for releasing said latch, and a yoke adapted to be moved by said cultivator when said cultivator is raised so as to return said clutch to its latch position.

2. In a device of the character described, the combination with a tractor of a rearwardly extending frame attached thereto, a horizontally disposed shaft positioned in said frame, means for rotating said shaft from said tractor, a clutch interposed between said driving means and said shaft, said clutch comprising a yoke engaging the female member of said clutch, said yoke having outwardly extending arms, a second yoke pivoted to said frame and adapted to contact the arms of said first mentioned yoke, a roller positioned upon the lower extremity of said second mentioned yoke, a pivoted latch adapted to engage the female member of said clutch for the purpose of retaining the same in retracted position, a pair of chain pulleys positioned on said shaft, chains reaved there over and having one end attached to a cultivator frame pivotally supported on said first mentioned frame, and an incline member secured to said cultivator and adapted to contact said roller when the cultivator is elevated for the purpose of disengaging said clutch.

In testimony whereof I affix my signature.

CHARLES C. BUSSINGER.